United States Patent [19]

Häfner

[11] Patent Number: 5,291,795
[45] Date of Patent: Mar. 8, 1994

[54] TRANSMISSION ELEMENT FOR FORCE OR MOMENT MEASURING DEVICES

[75] Inventor: Hans W. Häfner, Aichach-Walchshofen, Fed. Rep. of Germany

[73] Assignee: Pfister Messtechnik GmbH, Augsburg, Fed. Rep. of Germany

[21] Appl. No.: 793,086

[22] Filed: Nov. 15, 1991

[30] Foreign Application Priority Data

Jan. 31, 1991 [DE] Fed. Rep. of Germany ....... 4102931
Mar. 28, 1991 [DE] Fed. Rep. of Germany ....... 4110356

[51] Int. Cl.$^5$ .............................................. G01L 1/00
[52] U.S. Cl. ........................... 73/862.629; 73/862.041
[58] Field of Search .................. 73/862.621, 862.637, 73/862.642; 177/135, 134

[56] References Cited

U.S. PATENT DOCUMENTS

| | | | |
|---|---|---|---|
| 3,313,151 | 4/1967 | Kaye | 73/862.629 |
| 3,399,564 | 9/1968 | Kaye | 73/862.629 |
| 4,644,805 | 2/1987 | Hafner | 73/862.68 |
| 4,739,666 | 4/1988 | Hafner et al. | 73/862.68 |
| 4,750,577 | 6/1988 | Hafner | 177/135 |
| 4,754,653 | 7/1988 | Hafner et al. | 73/862.68 |
| 4,770,051 | 9/1988 | Hafner et al. | 73/862.68 |
| 4,984,467 | 1/1991 | Hafner | 73/727 |
| 5,149,121 | 9/1992 | Hafner | 73/862.621 |

Primary Examiner—Richard E. Chilcot, Jr.
Assistant Examiner—R. Biegel
Attorney, Agent, or Firm—Armstrong, Westerman Hattori, McLeland & Naughton

[57] ABSTRACT

A force transmission element for force or moment measuring devices includes a block of essentially incompressible elastomeric material for transmission of forces to at least one force or pressure sensor arranged within said block or in close contact with the elastomeric material, wherein said block is closely surrounded by an enclosure deformable in axial force measuring direction, but essentially not expandable in cross section essentially perpendicular thereto. Such force transmission elements may be used in force transmission devices and may be manufactured by at least partially casting the enclosure in the elastomeric material with the enclosure, if desired, serving as a mold.

13 Claims, 13 Drawing Sheets

TRANSMISSION ELEMENT FOR FORCE OR MOMENT MEASURING DEVICES

FIELD OF THE INVENTION

The invention relates to a transmission element for force or moment measuring devices, such devices and a method for manufacturing it.

BACKGROUND OF THE INVENTION

With force measuring devices frequently there is the problem that due to tolerances or temperature expansion, respectively, of the load introducing elements or the base, and due to variations in loading or a lateral influence, as by wind squalls or the like, the force measuring device is considerably affected outside the desired vertical force direction.

For example, FIG. 32 shows a bin 70 supported on a base 72 by force measuring devices 110 and corresponding supports 74. The force measuring devices 110 are loaded through lateral flanges 78 of bin 70. Depending on the extent bin 70 is filled, bending of flanges 78 may occur which may vary plan parallelism in the force measuring devices 110. Due to temperature expansion the distance between the central axes of force measuring devices 110 at the force introduction side may considerably be displaced in respect of the support side. Heavy side winds result in a tilting of bin 70 about a horizontal axis, again influencing the plan parallelism in force measuring devices 110, in addition to usual variations thereof. Furthermore, a twisting about a vertical axis is difficult to avoid. Therefore, specific measures must be taken ensuring the necessary degrees of freedom of movement without affecting the force measuring device in its measuring accuracy or even destroying it.

U.S. Pat. No. 4,754,653 discloses a force measuring device comprising as a force introducing element a piston inserted into a relatively high cylindrical recess of a pot-type housing forming a narrow annular gap filled with elastomeric material fixedly adhering to the contact surfaces. Through further elastomeric material the piston acts on a pressure sensor. The elastomeric material completely transmits the vertical force component to the pressure sensor, whilst lateral force components are shunted from the piston through the elastomeric material in the annular gap to the pot-type housing. This known force measuring device has a relatively high measuring accuracy; however, its manufacture is relatively expensive and its mounting is complex, if the influences mentioned above are to be avoided.

German Patent Application Publication No. 21 06 92 discloses a force measuring cell comprising a cube-type block of elastomeric material sandwiched between two plates and having a pressure sensor embedded therein. Such a force measuring device is relatively inaccurate, since upon force application the elastomeric block expands laterally causing a considerable hysteresis and non-linearity of the measuring results. Instead of the elastomeric block disc-type discrete bodies of different pressure stability may be stacked in a telescopic tube body, the discrete bodies being destroyed at a different loading each.

U.S. Pat. No. 4,466,297 discloses a force measuring device featuring a force transmission by a wedge arrangement with the wedge being supported by a cushion. The cushion may comprise a ring made of sandwiched layers of elastomeric material and metal and enclosing a liquid space. Therefore, there is no uniform elastomeric block.

The force measuring device according to German Patent Application Publication No. 35 02 275 comprises a pot having inserted therein an elastomeric cushion having included therein a pressure measuring cell and being loaded by a piston.

U.S. Pat. No. 4,770,050 relates to a pressure measuring cell with the pressure being transmitted to a pressure sensor through elastomeric material filled into a pot-type housing.

U.S. Pat. No. 4,739,666 relates to a force measuring device including a pot-type base body having a piston inserted therein, with elastomeric material being provided between the end surface of the piston and the bottom of the base body, the elastomeric material being in contact with at least one pressure sensor. The base body is supported by a pot bearing provided at its bottom side and including an elastomeric plate.

German Patent Application Publication No. 21 58 607 relates to a force measuring cell comprising spaces filled with liquid and peripherally enclosed by resilient elements. Force introduction is accomplished through a stiff center of the resilient elements which elements are formed in a sandwich-type manner.

German Patent Application Publication No. 29 17 363 discloses a force measuring device including a body being elastic along its length and form-stable over its cross section. It contains a liquid flowing through a duct to a pressure sensor.

SUMMARY OF THE INVENTION

It is the principal object of the invention to provide a force transmission element being insensitive against the influences mentioned above,. Furthermore, a force measuring device is provided having a simple design and being easy to manufacture and having a relatively high measuring accuracy. Furthermore, it should be able to develop returning forces for returning it to upright position, whilst the necessary degrees of freedom should be accomplished without additional elements.

Accordingly, the force transmission element of the invention comprises a block of essentially incompressible elastomeric material for transmitting forces onto at least one force or pressure sensor means arranged in close contact with the elastomeric material; and enclosure means deformable in axial force measuring direction but essentially not expandable in cross section essentially perpendicular thereto and tightly surrounding the block.

According to another aspect of the invention a force and/or moment measuring device comprises a block of essentially incompressible elastomeric material; enclosure means deformable in axial force measuring direction but essentially not expandable in cross section essentially perpendicular thereto and tightly surrounding the block; force introduction means engaging one end surface of the block; supporting means engaging an opposite end surface of the block; and at least one pressure sensor means arranged in close contact with the elastomeric material.

The non-expandable enclosure of the elastomeric material in cross sectional direction prevents, on the one hand, a radial expansion otherwise causing hysteresis and non-linearity of the measuring result; on the other hand, there is provided such a flexibility that considerable tolerances at the connected or engaging elements are compensated. Practically, there is provided a measuring rubber/metal element acting in vertical direction with high stiffness, whilst being resilient in angular and horizontal directions and against tilting about a horizontal axis or twisting around a vertical axis without detrimental influence on the measuring result.

The use of elastomeric material results in a considerable vibration attenuation with a very high intrinsic frequency depending on stiffness.

Further features and advantages of the force measuring device according to the invention and of the method of manufacture will become apparent from the following description of embodiments with reference to the drawings.

DESCRIPTION OF A PREFERRED EMBODIMENT OF THE INVENTION

The non-expandable enclosure of the elastomeric material in cross sectional direction may be accomplished by a type of corset, as illustrated in connection with FIGS. 1 to 12 or by a type of jacket not expandable in cross sectional direction according to FIGS. 13 to 25. First, the invention is explained in detail referring to embodiments using a corset. Then, there will follow a brief explanation only of embodiments using a jacket, which embodiments, if not specifically indicated different, correspond in design, function, effect and manufacture to the embodiments using a corset.

Figure 1:
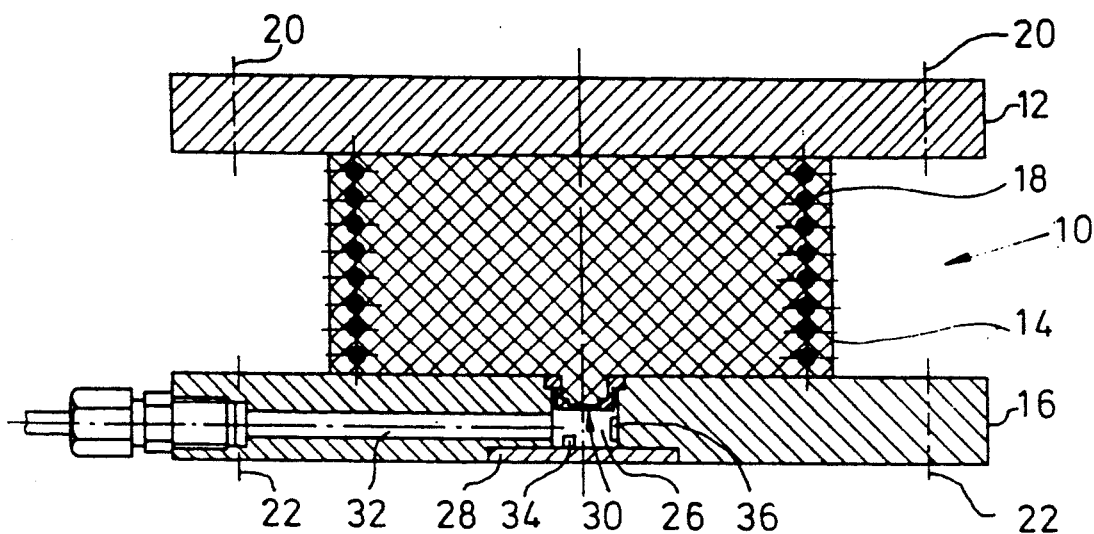
FIG. 1 is a vertical section through a force measuring device using a force transmission element according to a first embodiment of the invention.

FIG. 1 shows a force measuring device 10 comprising an upper and lower plate 12, 16 having arranged therebetween a force . transmission element consisting of elastomeric material in form of a block 14 of any desired, preferably circular or rectangular cross section.

According to the invention this preferably cylindrical block 14 is peripherally held by a type of corset consisting of material which is essentially not expandable in cross sectional direction.

With the embodiment a helical spring 18 is totally or partially embedded fixedly adherent such that it essentially encloses the whole elastomeric material.

Whilst upper plate 12, as indicated with Ref. No. 20, may be secured to a force introduction element, as a bin or a bridge scale platform, lower plate 16 supports on a base 24 and may be screwed thereto, as indicated at 22.

Lower plate 16 is provided with a central opening 26 having a pressure sensor 30 inserted therein which is in direct contact with the elastomeric material of block 14. As illustrated in FIG. 1, with a specifically preferred embodiment pressure sensor 30 is represented by a ceramic pot-type sensor body provided at its lower surface with corresponding pressure transducer elements, as a bridge circuit consisting of thick-film resistors (see U.S. Pat. No. 4,984,468 and U.S. Ser. No. 07/648,804). The interior of the sensor body is filled with elastomeric material as well. However, a piston may be inserted forming an annular gap and a bottom space, the piston being surrounded by elastomeric material.

Below pressure sensor 30, for example on a cover plate 28, an electronic sensor circuit 34 (amplifier, converter) may be applied which alternatively may be applied at a side wall of opening 26, as indicated with 36, which sensor circuit may be connected to an evaluation or indicating device (not shown) by a cable (not shown) guided through a radial bore 32.

Figure 2:
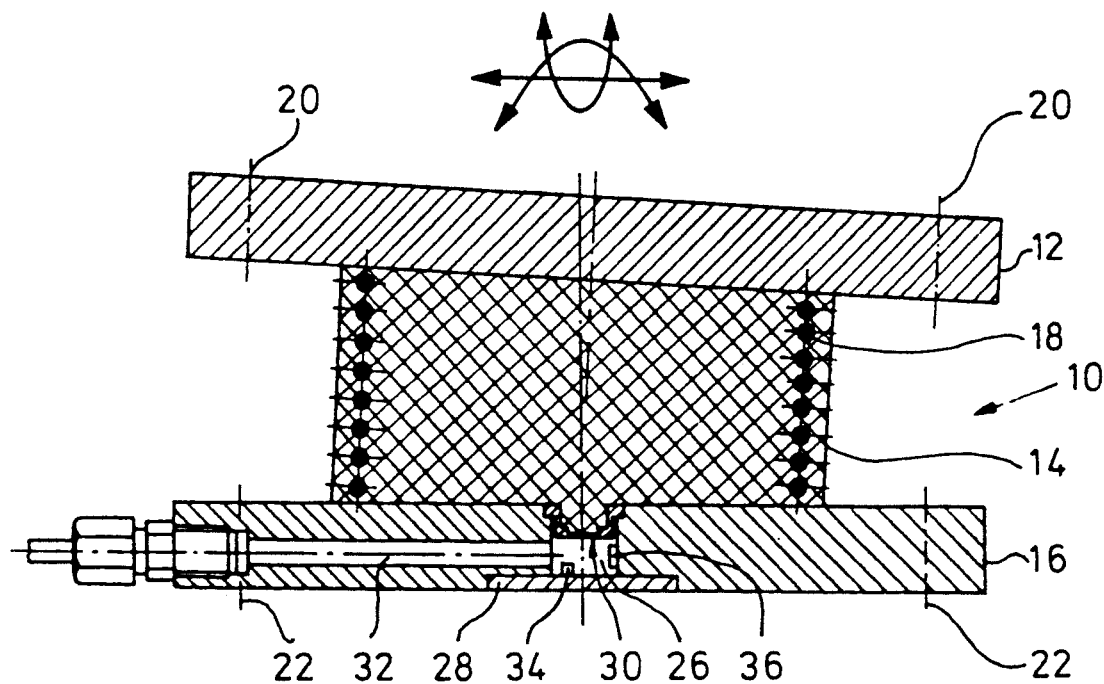
FIG. 2 is a view similar to that of FIG. 1, however with loaded force measuring device.

FIG. 2 clearly shows how force measuring device 10 reacts upon exertion of horizontal forces or forces causing a tilting about a horizontal axis. A similar effect may result by an offsetting of the central axis or by tolerances in the force introducing element or by a twisting about a vertical axis. Whilst the axial elasticity of helical spring 18 admits an asymmetric deformation of block 14 in axial direction, spring 18 prevents a lateral squeezing of block 14. Thus, a considerable stiffness is achieved in vertical direction, whilst a horizontal flexibility and a flexibility in tilting and twisting directions is provided. Furthermore, it should be noted that due to the elasticity of block 14 and helical spring 18 a returning or opposition force is exerted with the tendency to bring plate 12 in normal position, i. e. axially aligned and in plan parallelism to plate 16.

Figure 3:
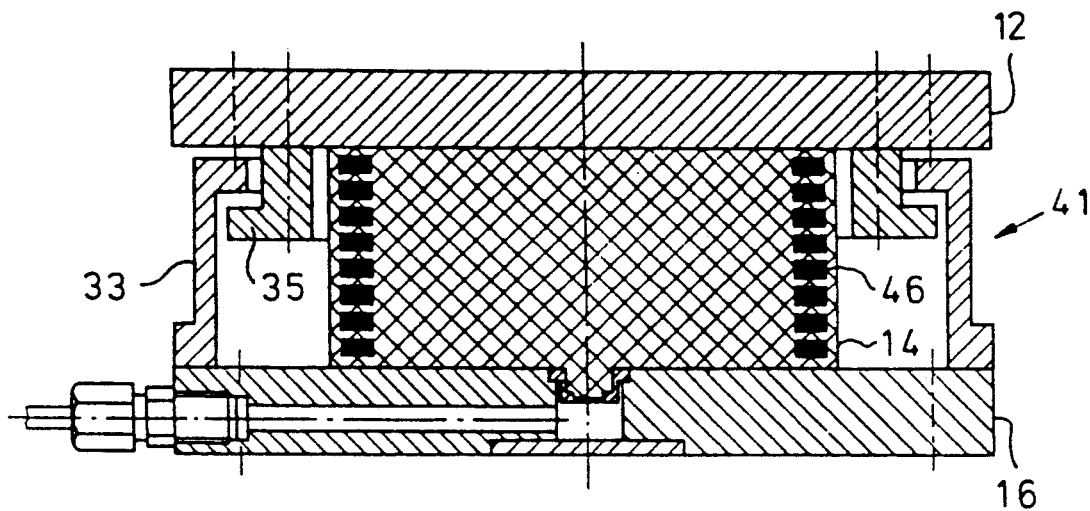
FIGS. 3 and 4 are vertical sections of embodiments modified in respect of the first embodiment.

FIG. 3 illustrates an embodiment of a force measuring device 41 as result of a modification of the embodiments of FIGS. 1 and 2, respectively.

The modification specifically relates to the design of the corset. Helical spring 18 is replaced by a larger number of flat rings 46 arranged at small distance to each other in a stack-like manner in block 14.

At this point the specific design of the corset and its embedding in block 14 should be considered in more detail.

At first, it should be noted that the corset is fixedly adherently embedded, at least to a larger portion, in the elastomeric material which may be achieved by vulcanizing the corset, preferably consisting of metal, in a fixedly adhering manner into the elastomeric material, with the fixed adhering being achieved by coating the metal prior to vulcanizing with a corresponding primer or another wetting means. This fixed adhering prevents the corset to be squeezed out of the elastomeric material upon force transmission. Therefore, the result is a piston/cylinder arrangement having a defined permanent cross section.

Of further importance is the shape and dimension of the slots adjacent to the spring windings or rings and filled with elastomeric material. The longer and the narrower these slots are, the higher is the stiffness of the force transmission element. Thus, the stiffness and the loading of the embodiment of FIG. 1 may be increased by replacing the wire cross section of helical spring 18 by a rectangular cross section, as with the corset of the embodiment of FIG. 3. Due to reasons of manufacture, it may be required or useful to maintain rings 46 at their exterior ends in a comb-like support with the embedding of the rings in elastomeric block 14 being not complete, but very good for the purposes of the invention.

As indicated in FIG. 3, all embodiments may be provided with limiting means for the relative movement between the force introduction element, i. e. upper plate 12, and the force receiving element, i. e. lower plate 16.

FIG. 3 shows an embodiment of limiting means comprising a lower peripheral height and side limiting stop 33 in tube form having an upper inner flange with the upper end surface simultaneously serving as a stop for vertical overloading. As a counterpart an upper height and side movement stop 35 is secured complementary thereto at the bottom side of plate 12, with the mutual arrangement being such that a certain lateral loose (and some twisting possibility) as well as a certain loose for the movement of plate 12 upwards are provided.

It should be noted that, as compared with the embodiments explained above, upper plate 12 may be omitted. This fact illustrates the versatility of applications. Onto the top side of block 14 any desired unit or device may be placed covering the top surface of block 14. Preferably, vulcanizing of the top surface of block 14 to the bottom side of this unit or device is provided.

Figure 4:
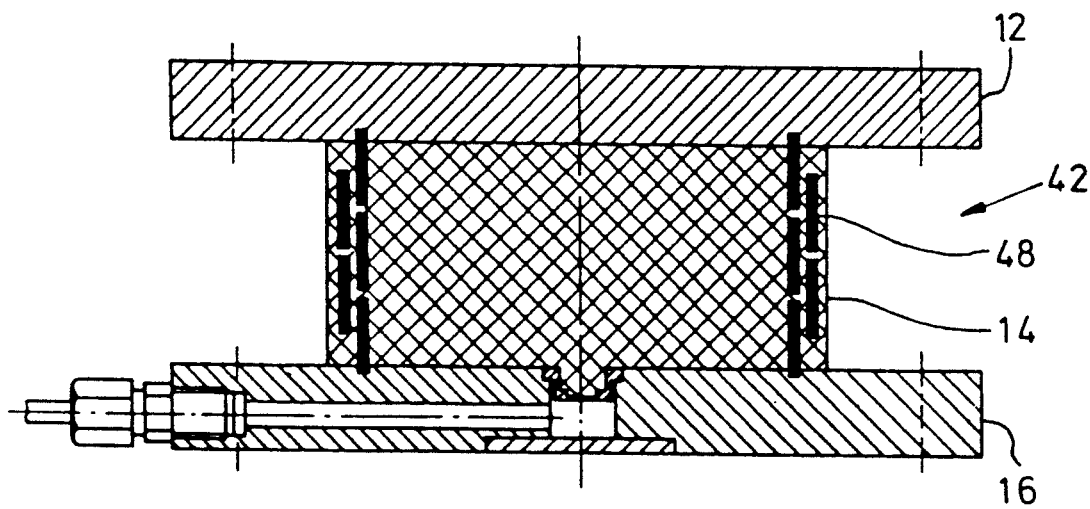

With the embodiment of FIG. 4 helical spring 18 is replaced by two rows of rings 48 concentrical and offset to each other and having a rather tube-type design with a small distance from each other such that, as with the embodiments of FIGS. 1 and 2, respectively, the necessary flexibility is provided. As indicated in FIG. 4 the corset of the invention may be secured to the upper and/or lower plate 12 and 16, respectively. Alternatively, or in addition thereto, block 14 fixedly adheres to the contact surfaces of the upper and lower plate 12, 16, respectively, which may be achieved by vulcanization after appropriate primer treatment.

The overlapping arrangement of rings 48 results in an extreme increase in slot length and, therefore, in a specific stiffness and practically complete gripping of the elastomeric material of block 14 permitting extremely high loadings.

Though with the embodiments explained above a ceramic pot sensor is used, any desired other pressure sensors may be used as well with a corresponding forming of opening 26. Other embodiments of corsets are feasible, as a non-expandable fiber-type web made of metal, glass, carbon, or synthetic material closely surrounding block 14, or a type of hose having a corresponding enforcement. Specifically for high forces plates 12 and 16 will be made of metal, whilst with lower forces embodiments made of ceramic or any other form-retaining material may be used. For example, at opening 26 a force measuring plug according to U.S. Ser. No. 07/648,804 may be engaged, or a pressure sensor may be mounted at the bottom side the diaphragm or other pressure receiving element covering opening 26.

FIGS. 5 to 9 illustrate embodiments of force measuring devices of the invention having pressure sensor 30 embedded in block 14.

Figure 5:
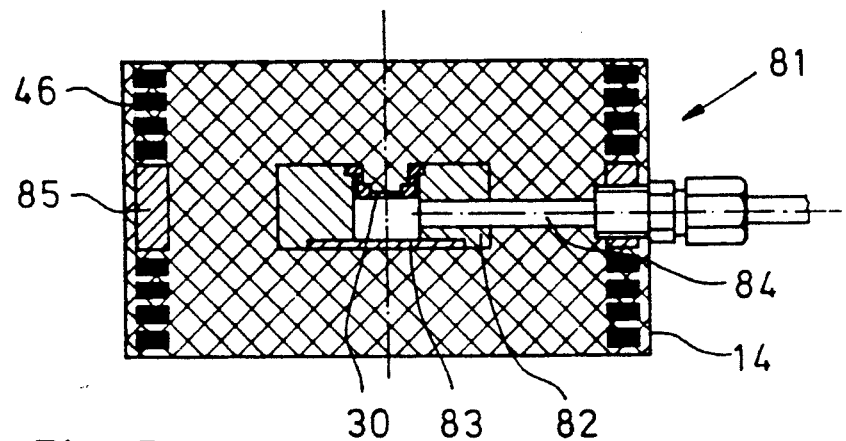
FIGS. 5 to 10 are vertical sections of force measuring devices according to further embodiments of the invention with embedded pressure sensor.

Specifically FIG. 5 shows a force measuring device 81 having a ring body 82 of permanent shape with cover plate 83 and pressure sensor 30 supported thereby vulcanized in block 14, again with the elastomeric material fixedly adhering to the contact surfaces. Tube 84 corresponding to tube 32 of FIG. 1 supported by a ring 85 vulcanized in block 14 projects out of block 14. Since ring 85 is arranged between upper and lower rings 46, elasticity of block 14 is maintained.

Figure 6:
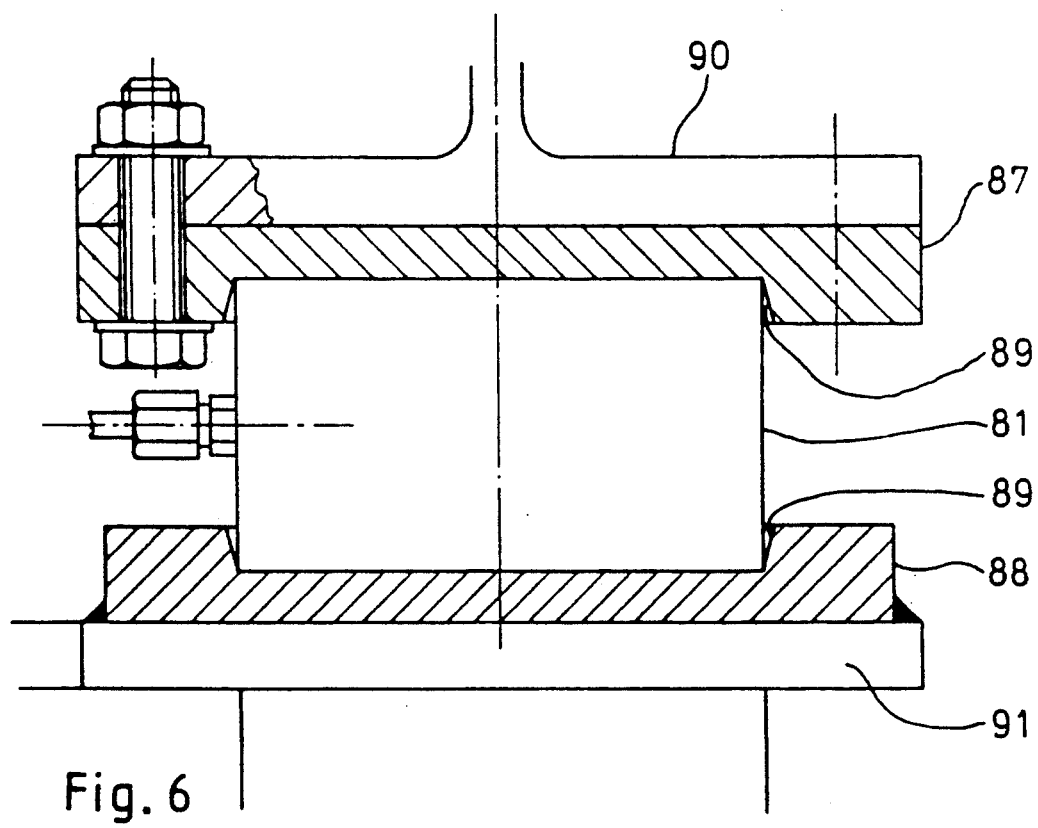

With the embodiment of FIG. 5 it should be noted that both the upper and lower plate 12, 16, respectively, are omitted such that this force measuring device 81 may be placed in any desired manner between two elements, as illustrated in FIG. 6. The two mounting elements are, for example, plates 87 and 88 provided with recesses 89 corresponding to the cross section of force measuring device 81. A specific example of use would be the mounting of a machine support 90 on a base 91.

Figure 7:
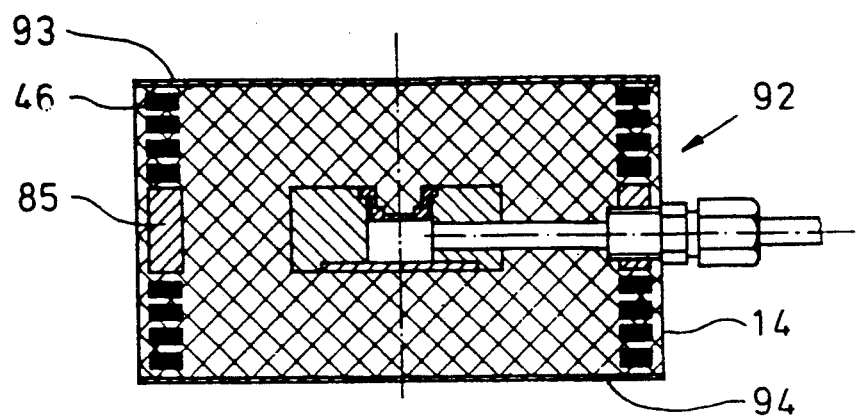

The embodiment of FIG. 7 shows a force measuring device 92 modified against the embodiment of FIG. 5 such that the upper and/or lower end surface is covered with a thin plate 93 and/ or 94, respectively, exemplary made of metal, with the plate(s) vulcanized to block 14.

Figure 8:
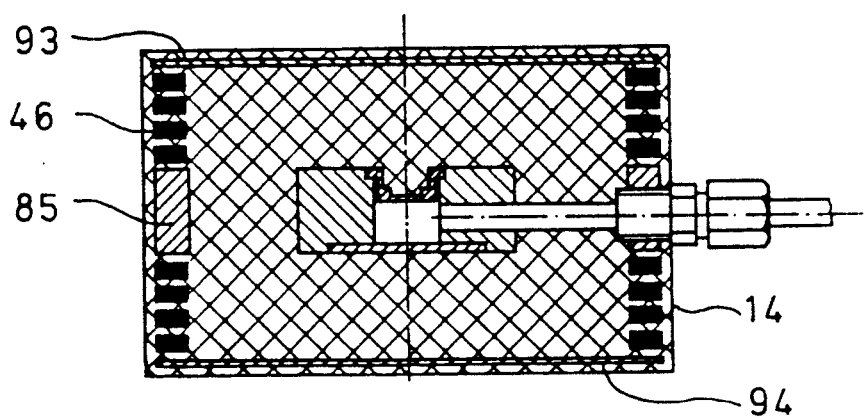

A modification of this embodiment is illustrated in FIG. 8, with the plates 93 and/or 94, respectively, vulcanized in block 14.

Figure 9:
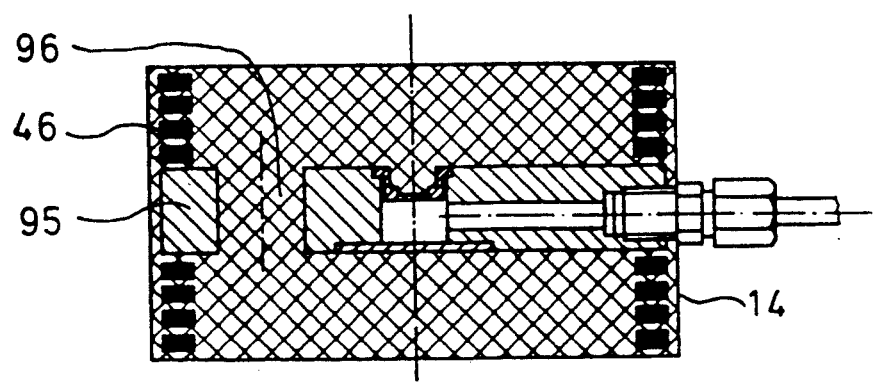

FIG. 9 illustrates a further modification of the embodiments of FIGS. 5 to 8 such that instead of ring 85 a plate 95 of shape-permanent material, as metal, ceramic, or synthetic material, is vulcanized into block 14, which plate 95 is provided with peripherally distributed openings 96 such that the elastomeric material of block 14 above and below plate 95 is in direct pressure transmission, since the openings are filled with elastomeric material.

Figure 10:
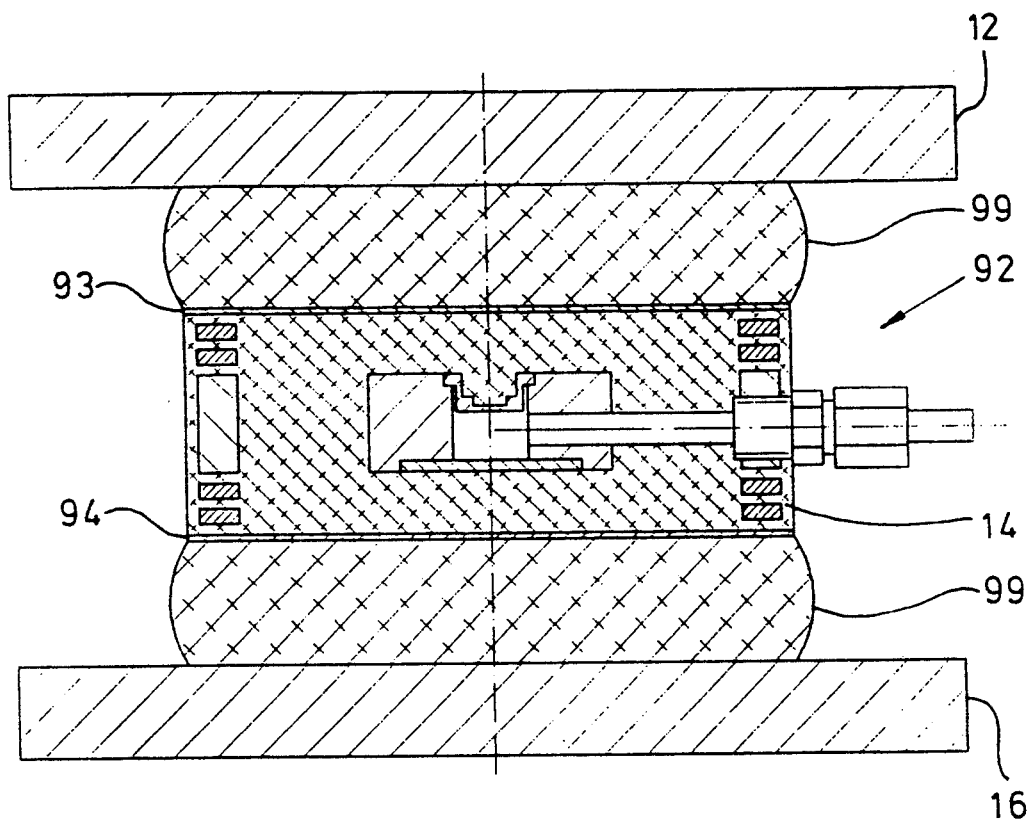

FIG. 10 shows a further modified embodiment which is particularly adapted for high impact loadings and more inclined positions of plate 12 in respect of plate 16. Just as an example, the force measuring device 92 of FIG. 7 is used and sandwiched with intermediate upper and lower cushions 99 between plates 12 and 16. The surfaces of elastomeric cushions 99 again fixedly adhere to the contact surfaces of plates 12, 16 and 93, 94, respectively. As a further preferred modification plates 93 and 94 may be omitted, with cushions 99 integrated in elastomeric block 14.

These embodiments result in a rubber/metal element having integrated thereto a force measuring device and may be used as a support or intermediate element whenever forces, moments, vibrations or the like are to be measured acting on an apparatus supported by such elements.

Figure 11:
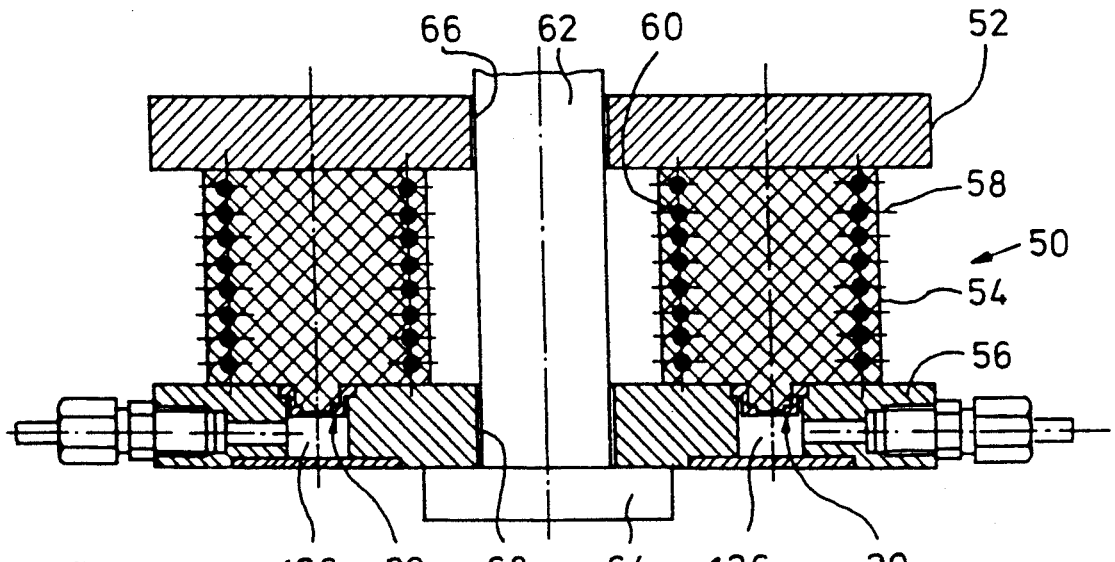
FIGS. 11 and 12 are vertical sections through force measuring devices according to further embodiments of the invention, having a ring-type design of the force transmission element.

FIG. 11 illustrates a further embodiment of the invention representing a ring-type force measuring device 50 designed, in principle, with using the features of the embodiments explained above.

With this force measuring device 50 upper and lower plate 52 and 56, respectively, are provided with central openings 66 and 68, respectively, through which a plunger 62 provided with a head 64 is passed.

In this case, a block 54 of elastomeric material is designed in a ring-type form, the exterior and interior peripheral surface being limited by an exterior and an interior helical spring 58 and 60, respectively.

Lower plate 56 may be provided with several equidistant openings 26 again having pressure sensors 30 inserted thereto. Upon non-uniform force application different pressures will be detected by pressure sensors 30 with the total force being determined by combining these pressures (see U.S. Ser. No. 07/648,804).

If only one pressure sensor 30 is to be used, a uniform pressure distribution and complete pressure transmission may be accomplished by filling a low-viscous to liquid transmission medium into an annular channel 126 preferably provided adjacent to pressure sensor 30 (see U.S. Ser. No. 07/648,259). This feature influences the stiffness or elasticity, respectively, of the force transmission element.

Figure 12:
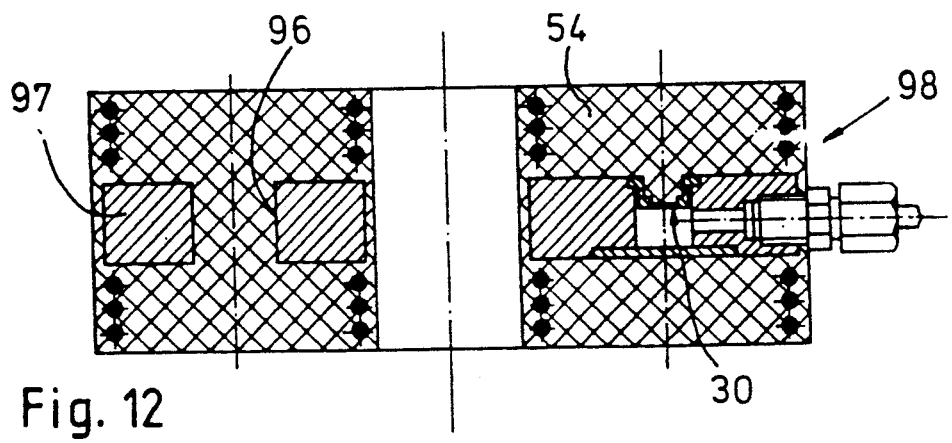

With the embodiment of FIG. 12 the arrangement according to FIG. 11 is modified in accordance with the embodiment of FIG. 9 with a plate 97 corresponding to plate 95 and one or several peripherally distributed pressure sensor(s) 30 arranged in corresponding openings, whilst other openings 96 are filled with elastomeric material.

Though the above-mentioned variations and modifications of individual embodiments of force measuring devices have been explained, the indicated features may be used with other combinations of force measuring devices in order to adapt them to a variety of applications.

For manufacturing the force measuring devices of the invention, for example, first plates 12, 16 or 52, 56, respectively, are prepared with the pressure sensors 30 inserted thereafter into openings 26. Now the corset, for example helical spring 18 treated with a wetting agent, is placed into a mold fitting for block 14 or 54, respectively, and the mold is filled with a prepared, preferably liquid material mixture for the elastomeric material, for example casted in, injected, pressed in, or the like, and the material is solidified, for example hardened, bound, vulcanized, etc., depending on the starting material used. If desired, vulcanizing the elastomeric material to plate 16 or 56, respectively, may be accomplished or enhanced, respectively, by heat application onto plate 16 or 56, respectively, durinq or after hardening. Alternative to molding or casting block 14 the latter may be cut from a pre-fabricated rod. During casting or pre-fabricating care must be applied in order to avoid any bubble-forming (see for instance U.S. Pat. No. 4,754,653).

Upper plate 12 or 52, respectively, is put into place either after hardening or, preferably, already after filling-in of the material. Alternatively, plate 12 or 52, respectively, may be put into place already prior to filling-in of the material with the plate being provided with openings for removal of air replaced by filled-in material.

If a synthetic material is used as elastomeric material, its hardness may be varied depending on the mixing ratios such that shore hardnesses up to 200 may be achieved.

In this connection it should be noted that block 14 or the force transmission element of the invention, respectively, as such may be used in any desired situation and in particular then, when for force transmission to a measuring element the influences initially mentioned are to be excluded.

The embodiments explained above are of principal nature. The feature of the invention, i. e. to use for force transmission an elastomeric block enclosed in a corset may be used with various force measuring devices, as they are, for example, disclosed in detail in the following publications: U.S. Pat. No. 4,644,805, U.S. Pat. No. 4,754,653, U.S. Pat. No. 4,864,874, and U.S. Pat. No. 4,864,874.

A preferred ceramic pressure sensor has been disclosed in more detail in the publications EP 0 333 091, U.S. Pat. No. 4,984,468, and U.S. Ser. No. 07/648,259.

A specific embodiment is a flat-spread force measuring device, as a platform scale (see U.S. Pat. No. 4,644,805). In this case, a larger number of pressure sensors is embedded in an elastomeric layer sandwiched between two relatively large plane-parallel plates with the elastomeric layer peripherally surrounded by a corset preventing the squeezing out of the elastomeric material.

Now, various embodiments are explained, where the corset is replaced by a jacket.

Figure 13:
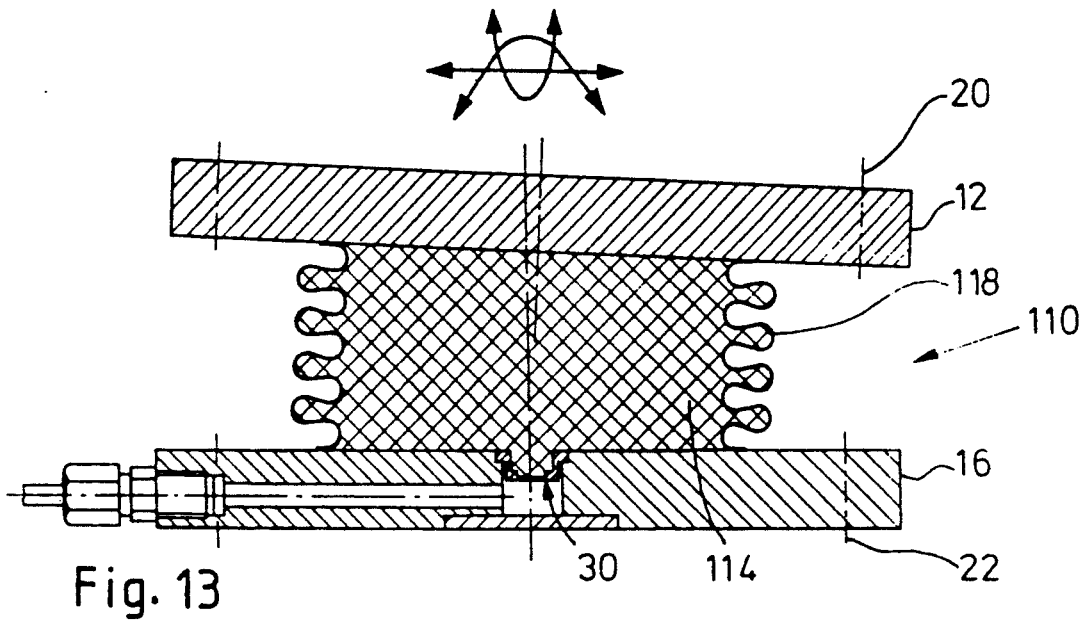
FIGS. 13 to 16 are vertical sections through a force measuring device using a force transmission element according to a further embodiment of the invention and various modifications thereof.

FIG. 13 corresponds to FIG. 1 and shows a force measuring device 110 with an upper and a lower plate 12, 16, a force transmission element made of elastomeric material in form of a block 114 being arranged therebetween, block 114 being peripherally enclosed by a jacket, for example a bellow 118, with this jacket being made of a material essentially not expandable in cross sectional direction, whilst resilient in all other directions.

Figure 14:
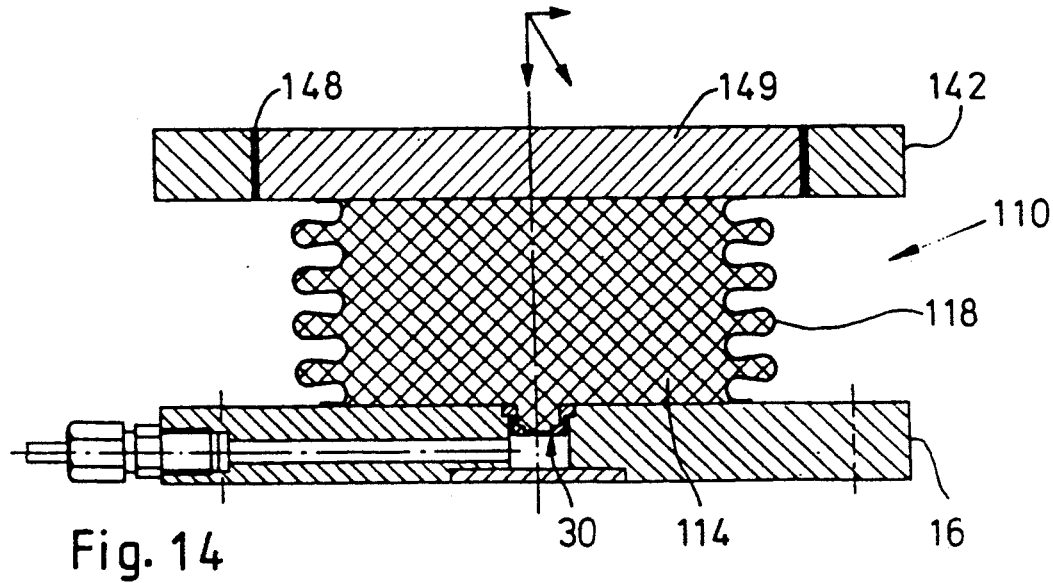

FIG. 14 shows an embodiment of a force measuring device 110 slightly modified as compared with that of FIG. 13. Specifically, plate 12 is replaced by a ring 142 surrounding an inner plate 149 by forming a narrow annular gap 148. Annular gap 148 is filled with elastomeric material fixedly adhering to the contact surfaces and thus connecting plate 149 to ring 142. Ring 142 is in a stationary, rigid relation to base plate 16. The vertical guidance of the inner plate 149 by the elastomeric material in annular gap 148 ensures that a major portion of eventual lateral forces are shunted away and that only residual lateral forces are to be compensated by the force transmission element, i. e. block 114.

Figure 15:
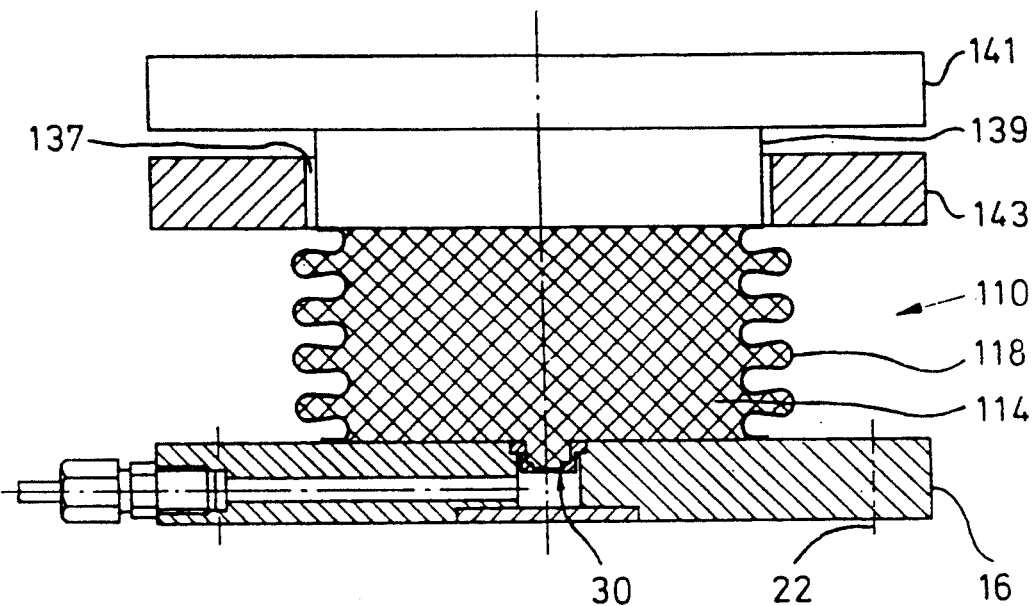

FIG. 15 illustrates an embodiment where a lateral movement of a cover plate 141 relative to bottom plate 16 is limited by a ring 143 rigidly connected to bottom plate 16. Ring 143 has a central opening 137 into which with a larger loose a piston 139 is inserted the lower end surface of which being connected to block 114 and bellow 118 and which is formed at the bottom side of cover plate 141.

Figure 16:
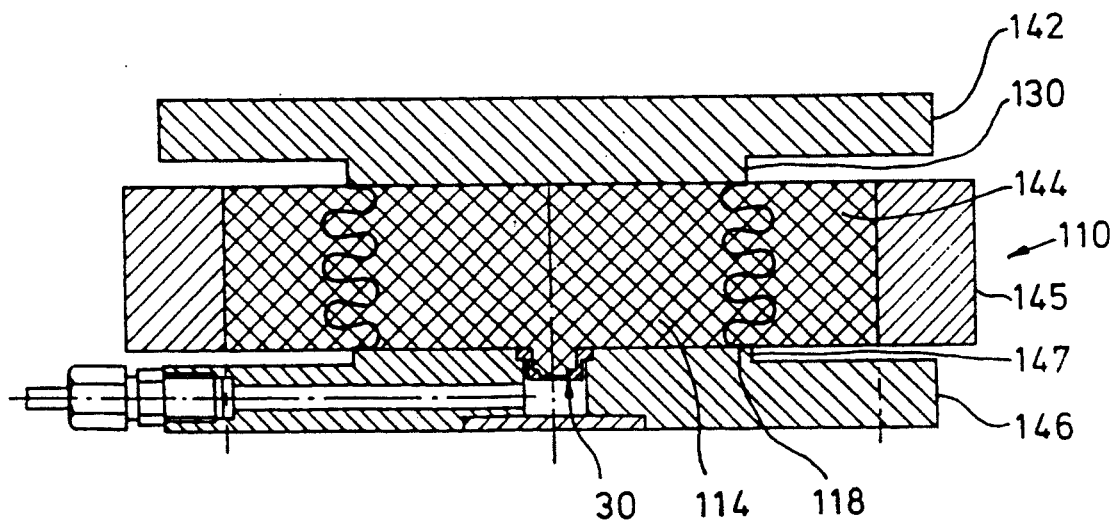

FIG. 16 shows a modified embodiment where block 114 enclosed in bellow 118 is elastically supported from the exterior by having bellow 118 being surrounded by further elastomeric material 144 fixedly adhering to the interior surface of a ring 145 surrounding material 144.

Upper plate 12 (FIG. 13) is replaced by a cover plate 142, at the bottom side of which a piston 130 is formed corresponding peripherally to the average diameter of bellow 118. Engaging end surfaces of block 114 and piston 130, respectively, are fixedly connected to each other as all other metal surfaces of plates 12 and 16 in contact with the elastomeric material of block 114.

Bottom plate 16 of the embodiment of FIG. 13 is replaced with the present embodiment of FIG. 16 by a bottom plate 146 provided with a projecting piston 147 as well, with an exterior diameter corresponding to the average diameter of bellow 118.

This embodiment has the advantage that bellow 118 is supported from the exterior such that with a corresponding compensation of lateral forces even larger forces may be applied or transmitted, respectively.

Figure 17:
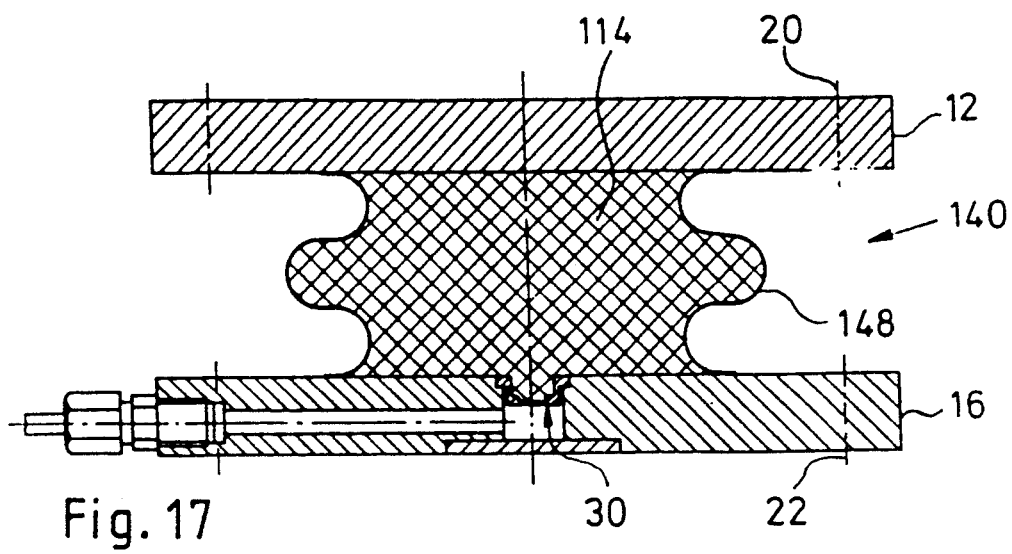
FIGS. 17 to 19 are views similar to that of FIG. 16 of an embodiment modified in respect of the force transmission element of FIG. 16.
Figure 18:
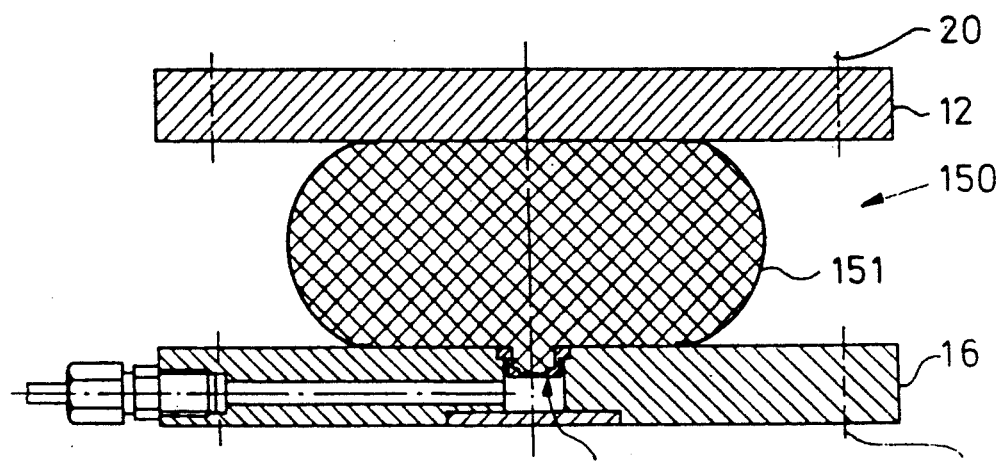
Figure 19:
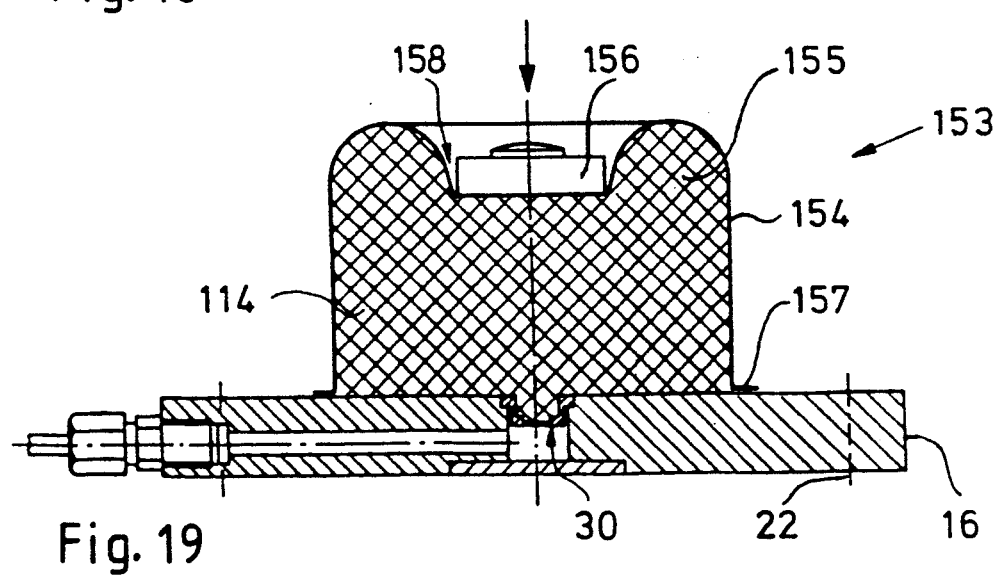

FIGS. 17, 18 and 19 illustrate embodiments 140, 150 and 153 resulting from modifications of the embodiments of FIGS. 13 to 16.

The modification relates to the form of the jacket. Instead of bellow 118 having a larger number of bulges, a jacket 148 with only one bulge (FIG. 17) or a jacket 151 having a curved, in particular circular outer conture (FIG. 18) is used.

The embodiment of FIG. 19 is still further modified to the extent that cover plate 12 is omitted and a jacket 154 is formed such that it resumes the function of cover plate 12 (FIG. 16). Whilst with the embodiments explained above the jacket has a generally cylindrical shape with opposite open ends, jacket 154 of the embodiment of FIG. 19 is closed at its upper end side. For example, the shape of a central recess 158 with a circular rounded rim 155 is chosen into which a force introduction element 156 may be inserted.

Lower edge 157 is peripherally secured to bottom plate 16 in an appropriate manner, as by welding, adhering or screwing. By the way, these fixing methods may be applied with any other embodiment as well.

At this point, the characteristics of the jacket and its connections with block 114 should be discussed in more detail. As mentioned before, bellow 118 or a jacket 148, 151, 154, respectively, should be designed such that it does not expand in cross sectional direction, whilst it should be resilient in preferably all other directions. A material used may be metal, a web made of non-expandable fibers or of synthetic material or a hose enforced by appropriate inserts.

The elastomeric material of block 114 should fixedly adhere to the surfaces of the bellow or jacket and should preferably be vulcanized thereto. The elastomeric material, as natural or silicone rubber, is filled in essentially bubble-free, as by applying vacuum or by applying a bubble removing method, as for example explained in U.S. Pat. No. 4,644,805, into the bellow or jacket, respectively, after being placed onto bottom plate 16 and secured thereto. The result is a piston/cylinder arrangement having a defined permanent cross section.

Figure 20:
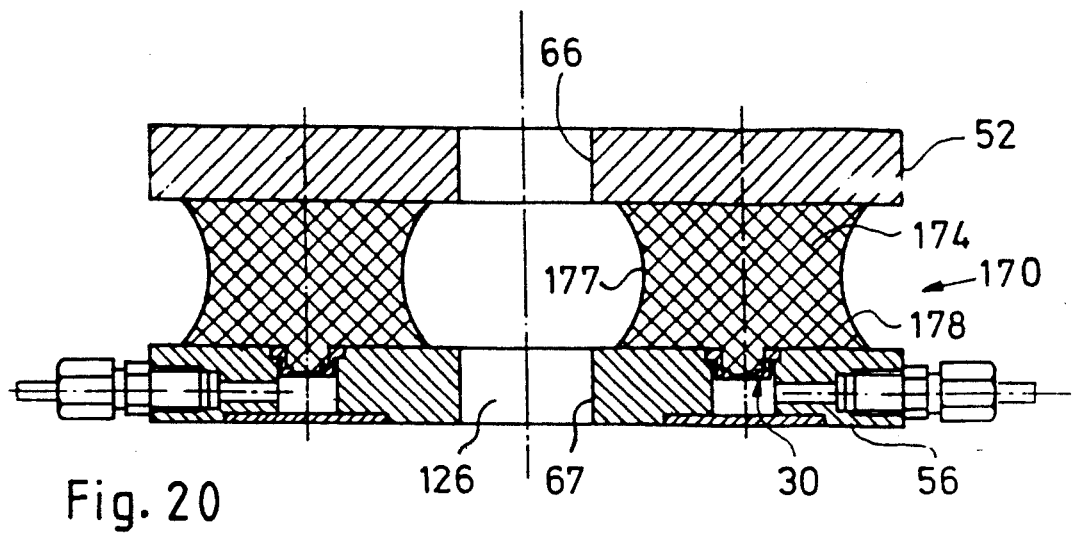
FIG. 20 is a vertical section of a ring-type embodiment.

FIG. 20 shows a further embodiment of the invention using a ring-type force measuring device 160 analog to the force measuring device 50 of FIG. 11. A block 164 of elastomeric material is formed ring-type in this case, the exterior and interior peripheral surfaces being limited by an inner and an outer jacket ring 177, 178 or a different jacket according to FIGS. 13, 17 or 18. The device 185 according to FIG. 21 using bellow 186 corresponds to the device of FIG. 7.

Figure 22:
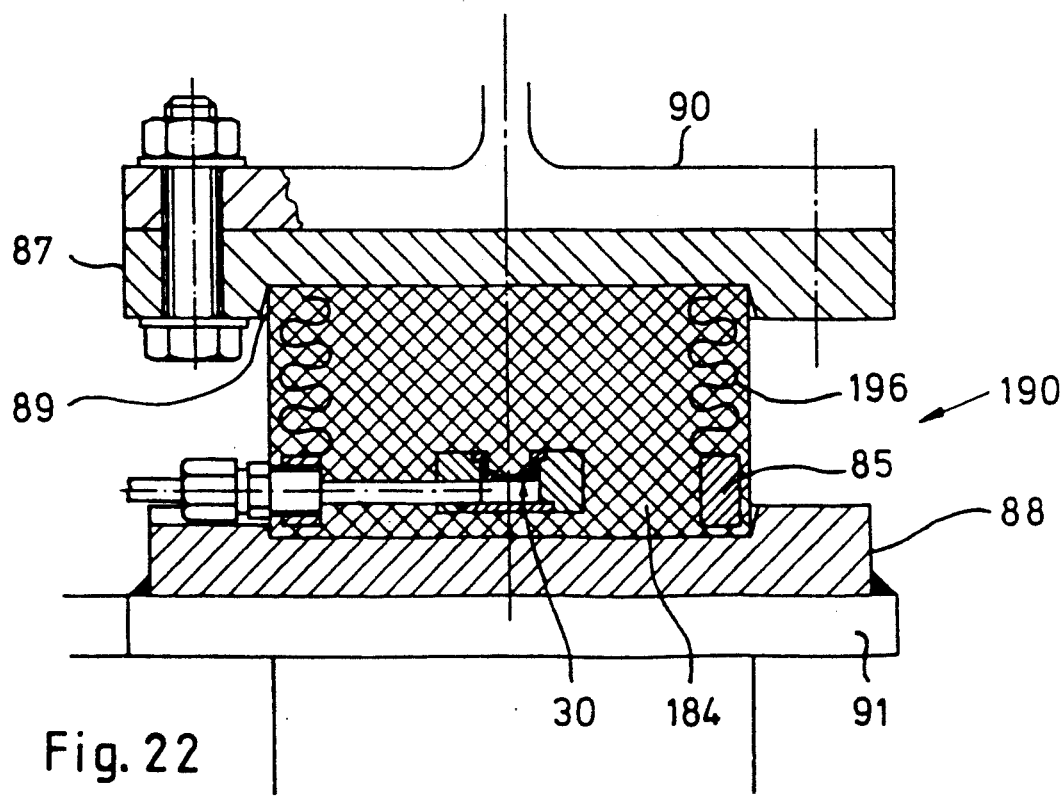
FIG. 22 is a vertical section through a force measuring device using, as an example, a force transmission element according to FIG. 21.

FIG. 22 illustrates an embodiment of a force measuring device 190 of the invention with pressure sensor 30 embedded in a block 184 of elastomeric material analog to FIGS. 5 and 6, with ring 85 being arranged in the lower region of elastomeric block 184 and having only one bellow 196 embedded therein.

Figure 23:
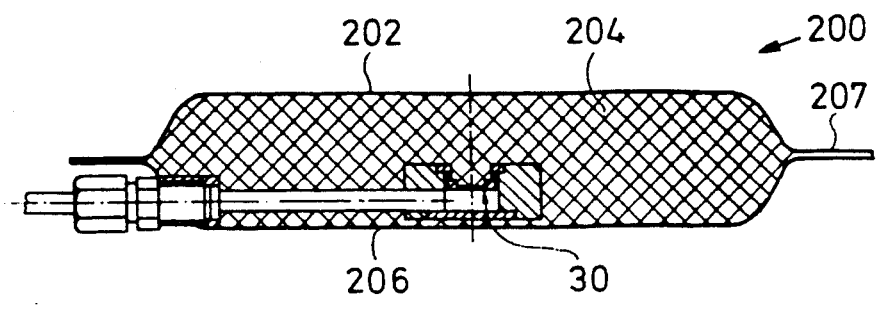
FIGS. 23 to 25 are views of force measuring devices according to embodiments of the invention using flat, essentially self-supported force transmission elements.
Figure 24:
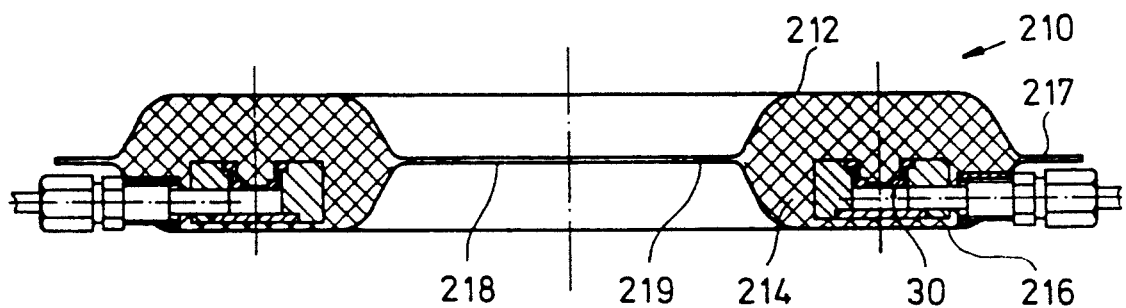
Figure 25:
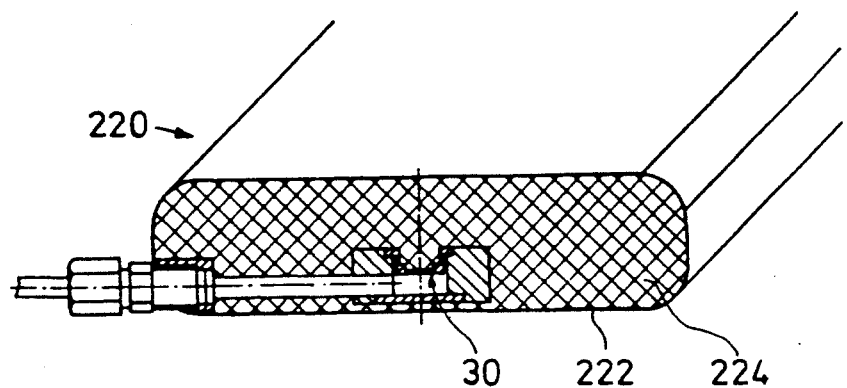

FIGS. 23 to 25 illustrate a further embodiment of the invention with modifications, which embodiment relates to a compact, in particular flat, independent or self-supporting, respectively, force measuring device.

FIG. 23 shows a force measuring device 200 comprising a flat block 204 of elastomeric material enclosed between two half-shells 202 and 206 connected to each other at laterally projecting rims 207 in an appropriate manner, as by welding, adhering, forming or rivetting.

In plan view the disc may be circular or have any other desired form. (By the way, this is true for all embodiments of transmission elements explained before). Again, pressure sensor 30 is embedded in block 204.

The advantage of this embodiment is the simple use and the inexpensive production. Half-shells 202, 206 are placed around block 204 having pressure sensor 30 embedded therein and the half-shells are pressed together peripherally along ring 207 and connected there. In use, the flat device is placed on a plane support and is ready for measurement. It may easily be placed below any object which mass is to be determined.

With the modified embodiment of FIG. 24 a force measuring device 210 is of ring-type form with a ring-type elastomeric block 214 surrounded by correspondingly formed half-shells 212, 216 connected to each other at an exterior rim 217 and an interior rim 219. The interor rim 219 may leave a central opening 218. With this embodiment several pressure sensors 30 may be arranged peripherally, preferably equally distributed. Alternatively, only one pressure sensor 30 may be used, if a ring of liquid or low-viscous material is arranged in block 214 for exact pressure transmission.

FIG. 25 shows a tape-like embodiment of a force measuring device 220 using a strip- or tape-type block 224 of elastomeric material surrounded by a jacket 222. Several pressure sensors 30 may be distributed along the device, preferably at equal distance to each other. Such a tape-like force measuring device 220 may be placed or lowered into the ground, respectively, normal to the moving direction, for example for determining the axle load of vehicles. With an appropriate elasticity and sensitivity such a tape-like force measuring device 220 may serve as a level indicator in bins or other large containers into which the tape is lowered.

Other embodiments of jackets are feasible, as a non-expandable fiber web closely surrounding block 214 made of metal, glass, carbon or synthetic material or a type of hose with appropriate enforcements.

Figure 26:
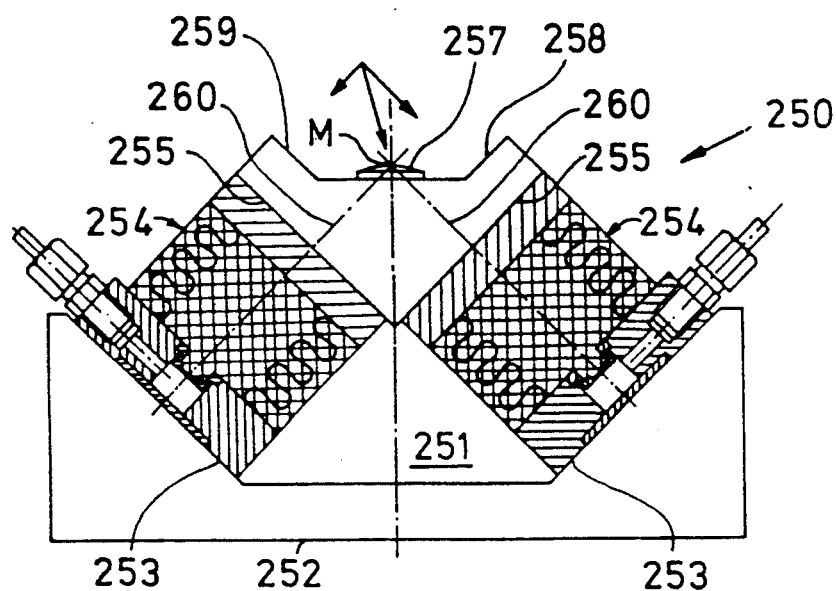
FIGS. 26 and 27 show multiple-dimension force measuring units comprising several force measuring devices according to the embodiments.

FIG. 26 shows an embodiment of a force measuring unit 250 illustrating how the principle of the invention may be used with advantage for a multi-dimensional force measurement.

Figure 21:
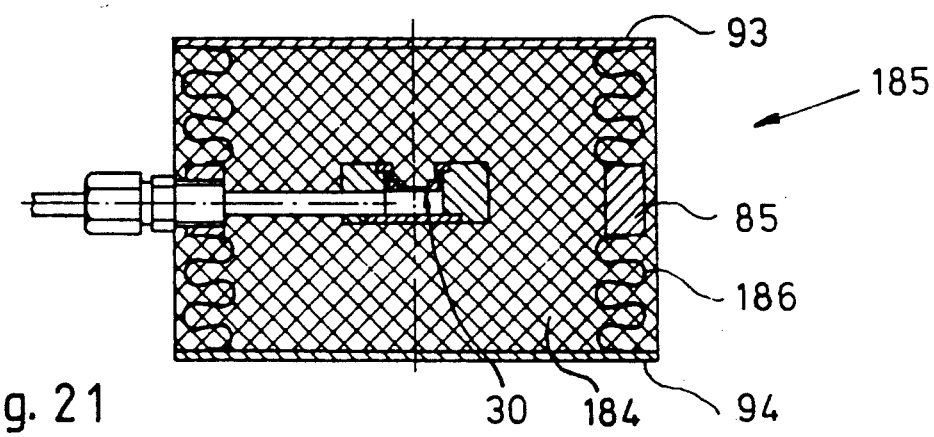
FIG. 21 is a vertical section of a block-type embodiment.

In detail, for example for a two-dimensional measurement, there is provided a base 252 having a central, preferably quadrangular frustro-pyramid-type recess having two opposite inclined surfaces 253 supporting a force measuring device 254 each, for example similar to those of FIGS. 21 or 22. With the preferably, however not necessarily, symmetrical arrangement the inclined surfaces 253 are arranged at any desired, however preferably approximately 90°, angle to each other. Force introduction is accomplished through force introduction element 258 having roof-type surfaces 255 engaged by the upper surfaces of force measuring devices 254; surfaces 255 extend normal each on the direction vectors of the force components to be measured. With the embodiment they form a 90° angle with each other.

The force introduction element 258 is, for example, formed as a triangular prism with the base surface directed upwards being provided with a recess 259 at the horizontal bottom of which extending at an angle of 45° to the surfaces 255 a force introduction hemisphere 257 may be secured.

As indicated by the force arrows, the forces exerted on the force introduction hemisphere 257 are distributed to the two force measuring devices 254 such that not only the amount thereof, but also their directions may be determined. With a two-dimensional arrangement forces or force components, respectively, are measured the vectors of which extend in one plane in which the central axes 260 of force measuring devices 254 exend as well.

It will be appreciated that the two force measuring devices 254 need not be arranged symmetrically. Furthermore, it will be recognized that an expansion to a three-dimensional measurement is easily possible by using a triangular cross section instead of recess 259 with quadrangular frustro-pyramid form, with three force measuring devices 254 arranged at angular offsettings by 120° each.

Figure 27:
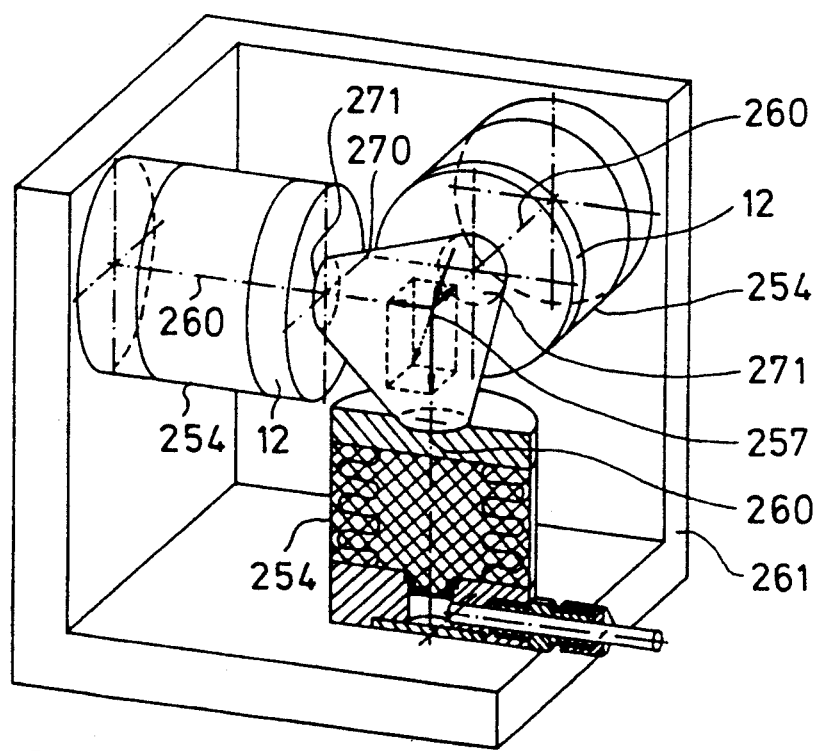
Figure 28:
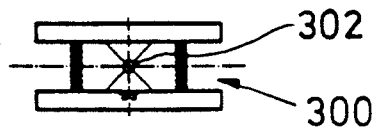
FIGS. 28 to 31 show force measuring units using force measuring devices according to the embodiments for moment determination.

FIG. 27 illustrates an alternative embodiment of a three-dimensional force measuring unit using again three force measuring devices 254 supporting on walls of a base 261 perpendicular to each other such that preferably their central axes 260 extending perpendicular to each other intersect in a force introduction point 257, a randomly directed force acting at a force introduction element 270 engaging by corresponding end surfaces 271 the corresponding plate 12 of the corresponding force measuring device 254. Above that, the same situation is applicable, as discussed before in connection with the two-dimensional force measuring units.

With the force measuring unit according to the invention, for example according to FIG. 26, moments or moment components may be determined, acting at a point M resulting by intersection of the central longitudinal axes of force measuring devices 254. The construction may be such that the force introduction element 258 is replaced by a structure or by a rod each extending from the force introduction side of each force measuring device 254 to point of intersection M. Upon an appropriate calculation in the evaluating device the force or moment introduction point may be located at any desired other position.

In this connection it is referred to FIGS. 28 to 31 illustrating the principle of moment measurement using a one-arm or two-arm lever.

FIG. 28 just shows again a force measuring device 300 represented by any desired, above-explained embodiment with a force measuring device according to FIG. 1 just indicated as an example. It is an essential characteristic of such force measuring devices 300 that independent from asymmetrical loading there exists a volume center of gravity of block 14 (FIG. 1), which center 302 acts as a virtual point of rotation and does essentially not change its position. The result is that the moment arm, i. e. the distance of center 302 from the spaced force introduction point remains constant enabling an accurate determination of moments.

Figure 29:
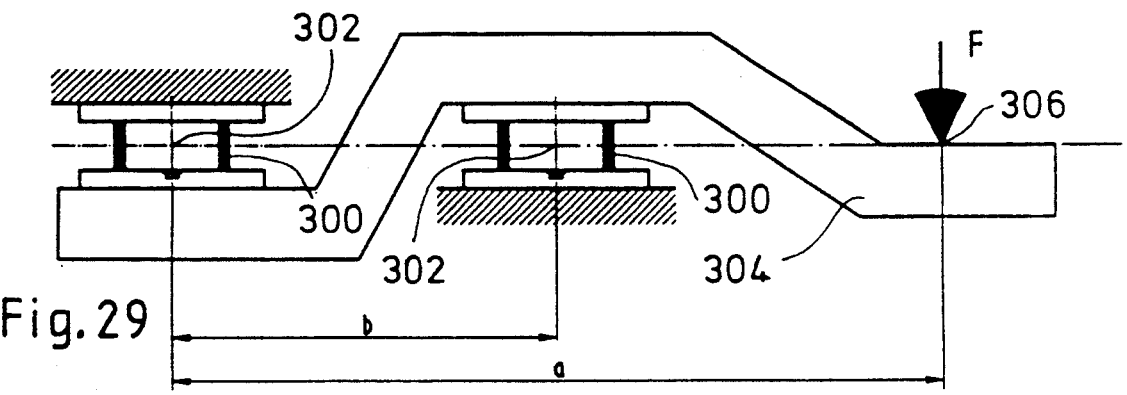
Figure 30:
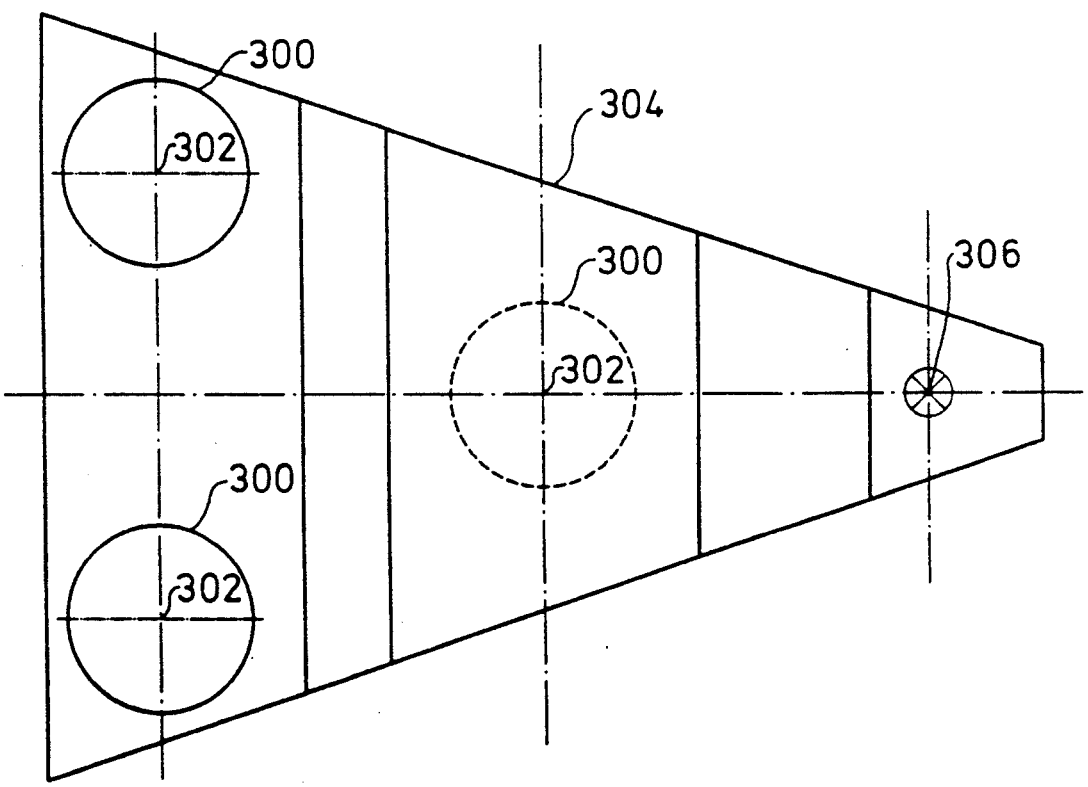

FIGS. 29 and 30 illustrate in a very principal presentation a moment determining unit in elevational and plan views, respectively. A bar 304 pivotally supported like a scale bar centrally on a force measuring device 300 bears at the one side (in FIG. 29, left) against at least one further force measuring device 300, preferably however against two force measuring devices 300 arranged remote from each other and at equal distance from the force introduction point in clockwise direction, whilst a force F is exerted vertically from above in the force introduction point 306 against the right arm (FIG. 29) of bar 304. Bar 304 is bent in a vertical plane such that centers 302 of the force measuring devices 300, and preferably force introduction point 306, are provided in one (horizontal) plane. Since, as mentioned before, the centers 302 of all force measuring devices 300 do not change their positions, moment arms a and b, respectively, are constant such that with the central force measuring device 300 the amount of force F is measured, whilst with the exterior force measuring devices 300 that moment may be accurately determined acting in view of force F around the center 302 of the central force measuring device 300. In this situation, center 302 of the central force measuring device 300 acts as a virtual point of rotation for the moment exerted.

As an alternative to the two-arm design or support, respectively, of bar 304, a one-arm arrangement is achieved when the two force measuring devices 300, in particular their centers 302, in FIGS. 29 and 30 on the left-hand side, are used in horizontal distance to each other as virtual points of rotation, with the central force measuring device measuring the force acting at center 302 onto bar 304. Assuming that a=2b, a force 2F will be measured with the moment acting at the virtual point of rotation being 2bF or aF, respectively.

In this connection it should be noted that the element only used as a virtual point of rotation needs not be designed as a force measuring device, i. e. pressure sensor 30 (FIG. 1) could be omitted at all or may not be circuit-connected.

Figure 31:
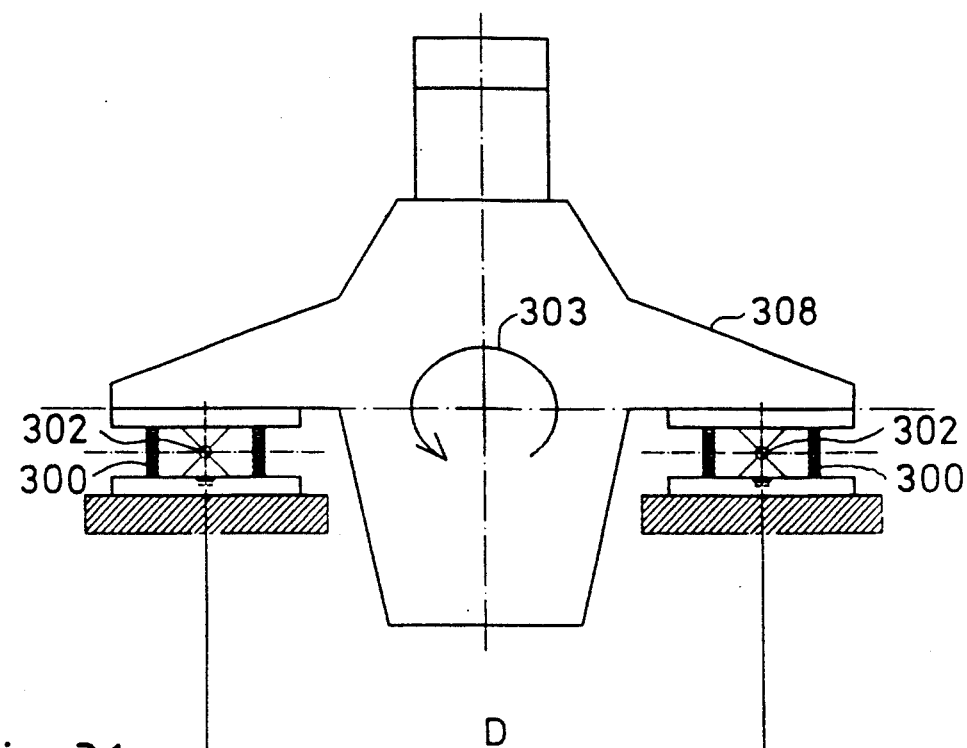

FIG. 31 shows a further embodiment where a motor 308 is supported at both sides on a force measuring device 300 each the centers 302 of which having a constant distance D. With a direction of rotation indicated by arrow 303 of the motor in counter-clockwise direction the right force measuring device 300, in particular its center 302 acts as the virtual point of rotation whilst the left force measuring device 300 measures a force which multiplied by D results in the torque or moment acting on motor 308.

It should be noted that for such multiple-dimensional force measuring units or moment measuring units, respectively, not only force measuring devices 10 according to FIG. 1 may be used, but any other force measuring device according to the embodiments explained above as well.

It should specifically be noted that force measuring devices may be used which instead of the jacket have a corset or vice versa.

Finally, it should be mentioned that with a force distribution to be expected, very unequal force measuring devices 254 or 300, respectively, need not be identical but may be designed for different force regions in order to improve the measuring accuracy.

Specifically, the embodiment of a multi-dimensional force measuring unit 250 clearly shows the high advantage of the force measuring devices 254, etc., according to the invention. Any inclination of the force introduction element 258 is readily compensated by an elastically giving way of the force measuring devices 254.

The manufacture of force measuring devices using a jacket corresponds to that using a corset. The bellow or jacket 118, 168, etc., will be pre-treated in the interior with a wetting agent, filled with a pre-fabricated, preferably liquid material mixture for the elastomeric material, f. i. poured in, injected, pressed in, or the like, and the material will be solidified, as hardened, bound, vulcanized, etc., depending on the starting material used. This may be achieved by vacuum application or centrifuging. With the embodiments of FIGS. 21 and 22 molding is accomplished in a mold having the bellow or jacket inserted thereto. Instead of an individual molding of the block the latter may be cut from a pre-fabricated bar.

Figure 32:
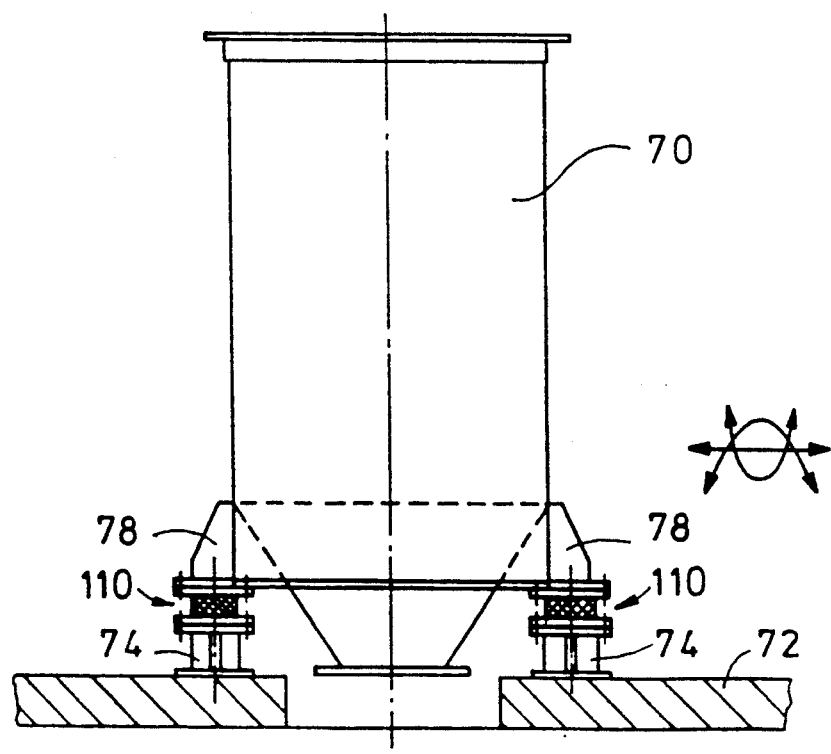
FIG. 32, is a schematic view of a system as an example for using force measuring devices according to the invention.

Finally, it is again referred to FIG. 32 and it will be apparent from the preceding explanations and embodiments what considerable advantage is achieved by using force measuring devices according to the invention.

When using the force measuring device according to the invention, influences due to temperature expansions, bending under load and lateral forces caused by wind and/or twisting movements about a vertical axis will be compensated.

Similar supports may be used with any other apparatuses where a force measurement with high accuracy is desired, f. i. with bridges, machines, or the like. Plates 12 and 16 may then have any desired form, as far as the end surfaces of block 14 are completely covered.

I claim:

1. A force transmission element for force and measuring devices, comprising:
    a block of essentially incompressible elastomeric material or transmitting forces;
    at least one force or pressure sensor means for sensing pressure or force arranged in close contact with said elastomeric material;
    said block having a first end surface, a second opposite end surface, and a surrounding perimeter wall surface between said end surfaces;
    said first end surface being constructed to receive a pressure force in an axial direction toward said second surface;
    a perimeter wall enclosure around said surrounding perimeter wall surface;
    said perimeter wall enclosure at a location around said surrounding perimeter wall surface being deformable in said axial direction but essentially not expandable generally perpendicular to said axial direction;
    said enclosure tightly surrounding said block around said surrounding perimeter wall;
    wherein said perimeter wall enclosure around said surrounding perimeter wall is at least partially embedded in said elastomeric material of said block in said surrounding perimeter wall and fixedly adhered thereto.

2. The force transmission element of claim 1, wherein said enclosure is a corset.

3. The force transmission element of claim 2, wherein said corset includes at least one elongated member surrounding said block and at least partially embedded in said block; said at least one elongated member having portions surrounding said block spaced in said axial direction with said elastomeric material of said block being therebetween.

4. The force transmission element of claim 3, wherein said corset is a helical spring.

5. The force transmission element of claim 1, wherein at least one of said first and second end surfaces of said block is covered by a thin metal plate.

6. The force transmission element of claim 1, further including:
    force introduction means for introducing a force to said block engaging said first end surface of said block;
    supporting means for supporting said block engaging said second opposite end surface of said block; and
    limiting means for limiting movement of said force introduction means with respect to said supporting means.

7. The force transmission element of claim 1, wherein said at least one pressure sensor is mounted in a rigid support body inside of said block.

8. The force transmission element of claim 1, wherein said block of elastomeric material is ring-shaped, said perimeter wall enclosure having an exterior perimeter member and an interior perimeter member each tightly surrounding said block at exterior and interior perimeter wall surfaces, respectively, of said block.

9. The force transmission element of claim 1, wherein said at least one pressure sensor means is arranged within said block.

10. A force and measuring device, comprising:
    at least one block of essentially incompressible elastomeric material;
    said block having a first end surface, a second opposite end surface, and a surrounding perimeter wall surface between said end surfaces;
    a respective perimeter wall enclosure for each said at least one block around said surrounding perimeter wall surface;
    said perimeter wall enclosure at a location around said perimeter wall surface being deformable in an axial direction between said end surfaces but essentially not expandable generally perpendicular to said axial direction;
    said enclosure tightly surrounding said block around said perimeter wall surface;
    force introduction means for introducing force to said at least one block engaging one of said end surfaces of each said at least one block;
    supporting means for supporting said at least one block engaging an opposite of said end surfaces of each said at least one block;
    at least one pressure sensor means arranged in close contact with said elastomeric material of each said at least one block; and
    wherein said enclosure around said surrounding perimeter wall is at least partially embedded in said elastomeric material of said block in said surrounding perimeter wall and fixedly adhered thereto.

11. The force and measuring device of claim 10, wherein said enclosure is a corset.

12. The force and measuring device of claim 10, wherein said block of elastomeric material is ring-shaped, said perimeter wall enclosure having an exterior perimeter member and an interior perimeter member each tightly surrounding said block at exterior and interior perimeter wall surfaces, respectively, of said block.

13. The force and measuring device of claim 10, wherein said block is generally a ring shape;
    said perimeter wall enclosure includes exterior and interior perimeter enclosure members tightly surrounding said block;
    said force introduction means and said supporting means being plate members each having a central passage;
    said at least one pressure sensor means being arranged adjacent to a generally ring-shape channel provided in close contact with said elastomeric material; and
    said ring-shape channel being filled with a low-viscous pressure transmission medium.

* * * * *